United States Patent
Smith et al.

(10) Patent No.: US 7,246,199 B2
(45) Date of Patent: Jul. 17, 2007

(54) DOUBLE BUFFERING OF SERIAL TRANSFERS

(75) Inventors: D. Stuart Smith, San Jose, CA (US); Theodore D. Rees, Mountain View, CA (US); Miguel Gabino Perez, Mountain View, CA (US)

(73) Assignee: Elantec Semiconductor, Inc., Milpitas, CA (US)

( * ) Notice: Subject to any disclaimer, the term of this patent is extended or adjusted under 35 U.S.C. 154(b) by 498 days.

(21) Appl. No.: 10/775,614

(22) Filed: Feb. 10, 2004

(65) Prior Publication Data

US 2004/0243744 A1 Dec. 2, 2004

Related U.S. Application Data

(60) Provisional application No. 60/474,043, filed on May 29, 2003.

(51) Int. Cl.
*G06F 13/00* (2006.01)

(52) U.S. Cl. .............................. 711/112; 714/5; 710/3; 710/52

(58) Field of Classification Search ...................... None
See application file for complete search history.

(56) References Cited

U.S. PATENT DOCUMENTS

| | | | |
|---|---|---|---|
| 4,044,339 A | | 8/1977 | Berg |
| 4,641,276 A | * | 2/1987 | Dunki-Jacobs ............... 710/71 |
| 5,243,699 A | * | 9/1993 | Nickolls et al. .............. 712/11 |
| 5,506,825 A | * | 4/1996 | Gushima et al. ............. 386/96 |
| 5,812,881 A | * | 9/1998 | Ku et al. ...................... 710/71 |
| 6,298,420 B1 | | 10/2001 | Chittor et al. |
| 6,470,467 B2 | * | 10/2002 | Tomishima et al. ......... 714/744 |

FOREIGN PATENT DOCUMENTS

| | | |
|---|---|---|
| DE | 37 39 423 A | 6/1989 |
| DE | 40 19 135 A | 12/1990 |
| EP | 0 744 752 A2 | 11/1996 |

OTHER PUBLICATIONS

Int'l Search Report for PCT/US2004/013601, Jan. 20, 2005.

* cited by examiner

*Primary Examiner*—Reginald Bragdon
*Assistant Examiner*—Thanh D Vo
(74) *Attorney, Agent, or Firm*—Fliesler Meyer LLP

(57) ABSTRACT

Double buffering of serial transfers is provided in order to allow for increased serial transfer rate without requiring increased internal processing speeds. A serial controller serially receives a word including address bits and data bits. During a write operation, the address bits are serially shifted into an address shift register, and the data bits are serially shifted into a data shift register. After the address bits and data bits are completely shifted into the respective address and data shift registers, the address bits and data bits are transferred in parallel to address and data holding registers. After the parallel transfers of the address bits and data bits from the address and data shift registers to the address and data holding registers, the address and data shift registers are available to serially receive additional address bits and data bits of an additional word.

12 Claims, 7 Drawing Sheets

DOUBLE BUFFERING OF SERIAL TRANSFERS

PRIORITY CLAIM

This application claims priority under 35 U.S.C. 119(e) to U.S. Provisional Patent Application No. 60/474,043, filed May 29, 2003, entitled "DOUBLE BUFFERING OF SERIAL TRANSFERS," which is incorporated herein by reference.

FIELD OF THE INVENTION

The present invention relates generally to serial transfers (e.g., in response to read and write operations). Specific embodiments of the present invention are directed to improved serial data transfers between a host and a component (e.g., laser driver) of an optical storage device.

BACKGROUND OF THE INVENTION

A host computer typically writes to and reads from registers and memory locations of a storage device using a bi-directional serial data input/output line (SDIO). For example, the host may send a 16 bit word including a 1 bit mode (specifying read or write), followed by a 7 bit address, followed by 8 bits of data. During write mode, the 7 bit address may specify a write address, and the 8 bits of data may specify the data to be written. During read mode, the 7 bit address may specify a read address, and the 8 bits of data may be the 8 bits of data being read from the specified address. Other variations are also possible.

Typically, the host will need to send many consecutive words to the storage device, thereby requiring that the storage device quickly deal with each word as it is received. However, the storage device may not always be able to deal with each word quickly because, for example, other components within the storage device may have higher priority access to the busses, registers and/or memory within the storage device that need to be accessed to deal with the read or write requests sent from the host. This may slow down the serial transfer rate between the host and the storage device. This may also require that the various components within the storage device operate at a much higher speed than the serial transfer rate.

There is a desire to overcome the above mentioned constraints. More specifically, it is desirable to increase (rather than limit) the serial transfer rate between the host and the storage device. Additionally, it is desirable to relax (rather than increase) operating requirements of a laser driver, while still being able to achieve a faster serial transfer rate between the host and the storage device containing the laser driver.

SUMMARY OF PRESENT INVENTION

Embodiments of the present invention provide schemes for double buffering serial transfers (e.g., read or write requests) in order to allow for an increased serial transfer rate without requiring increased processing speeds. During a write operation, a serial controller serially receives a word including address bits and data bits. The address bits are serially shifted into an address shift register, and the data bits are serially shifted into a data shift register. After the address bits are completely shifted into the address shift register, the address bits are transferred in parallel to an address holding register. Similarly, after the data bits are shifted into the data shift register, the data bits are transferred in parallel to a data holding register. After the parallel transfers of the address bits and data bits from the address and data shift registers to the address and data holding registers, the address and data shift registers are available to serially receive additional address bits and data bits of an additional word. Embodiments of the present invention also relate to serial data transfers during a read operation.

Further embodiments, and the features, aspects, and advantages of the present invention will become more apparent from the detailed description set forth below, the drawings and the claims.

DETAILED DESCRIPTION

Figure 1:
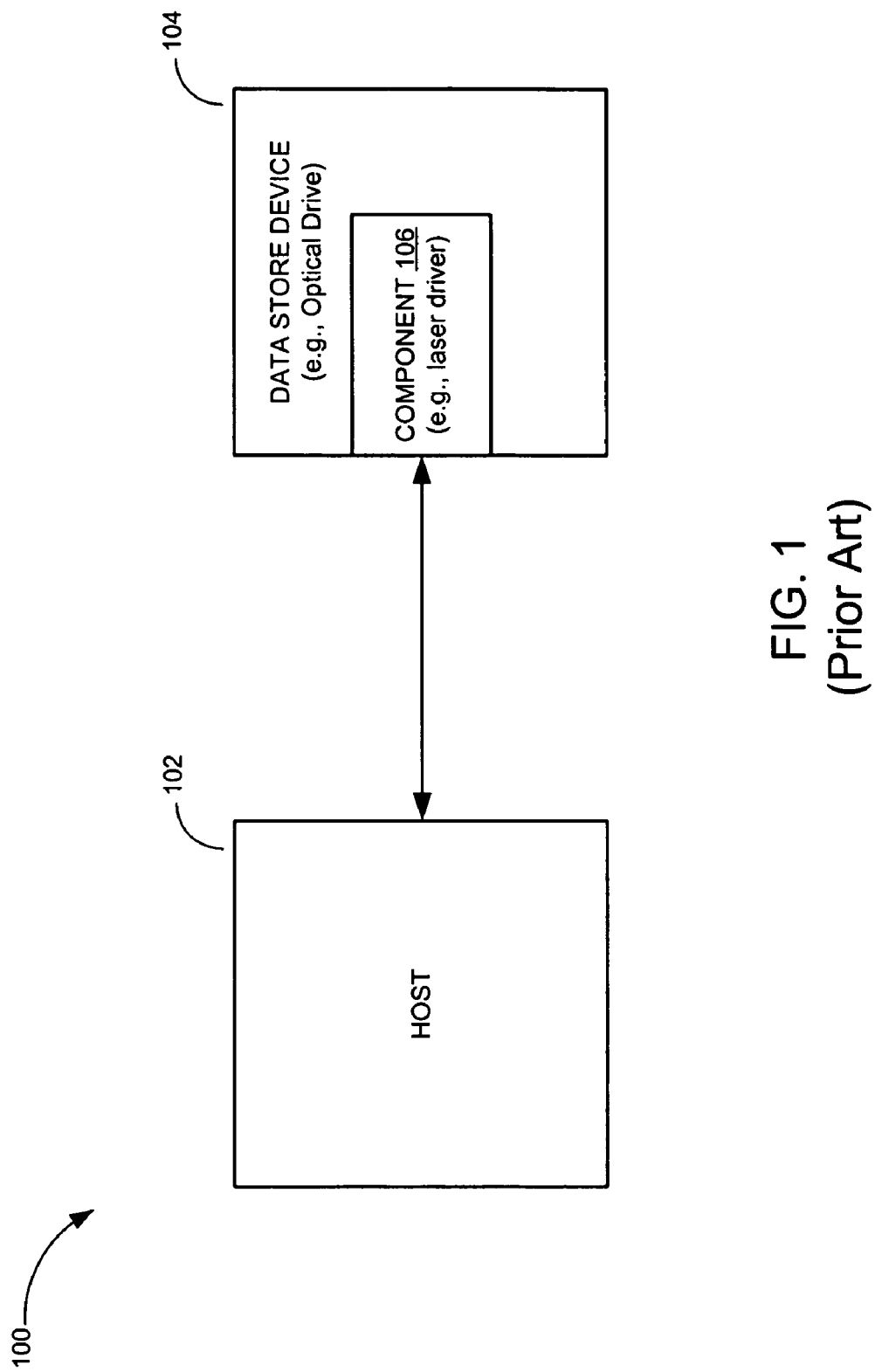
FIG. 1 is a high level diagram showing an exemplary environment in which embodiments of the present invention may be useful.

FIG. 1 is a high level diagram showing an exemplary environment 100 in which embodiments of the present invention may be useful. Referring to FIG. 1, a host 102 communicates with a component 106 (also referred to as a device) of a data storage device 104. The data storage device 104 can be, for example, an optical storage device that includes one or more optical disks upon which user data can be stored. The component or device 106 of the optical storage device 104 can be, for example, a laser driver that drives a laser diode in order to read data from, and the write data to, the one or more optical disks. Depending on the implementation, the communications between the host 102 and the laser driver 106 can be serial and/or parallel. In the following description, it is assumed that the storage device 104 is an optical storage device, the component 106 is a laser driver, and that the host 102 and the laser driver 106 are communication using both serial and parallel communications, which will be described in more detail below.

Figure 2:
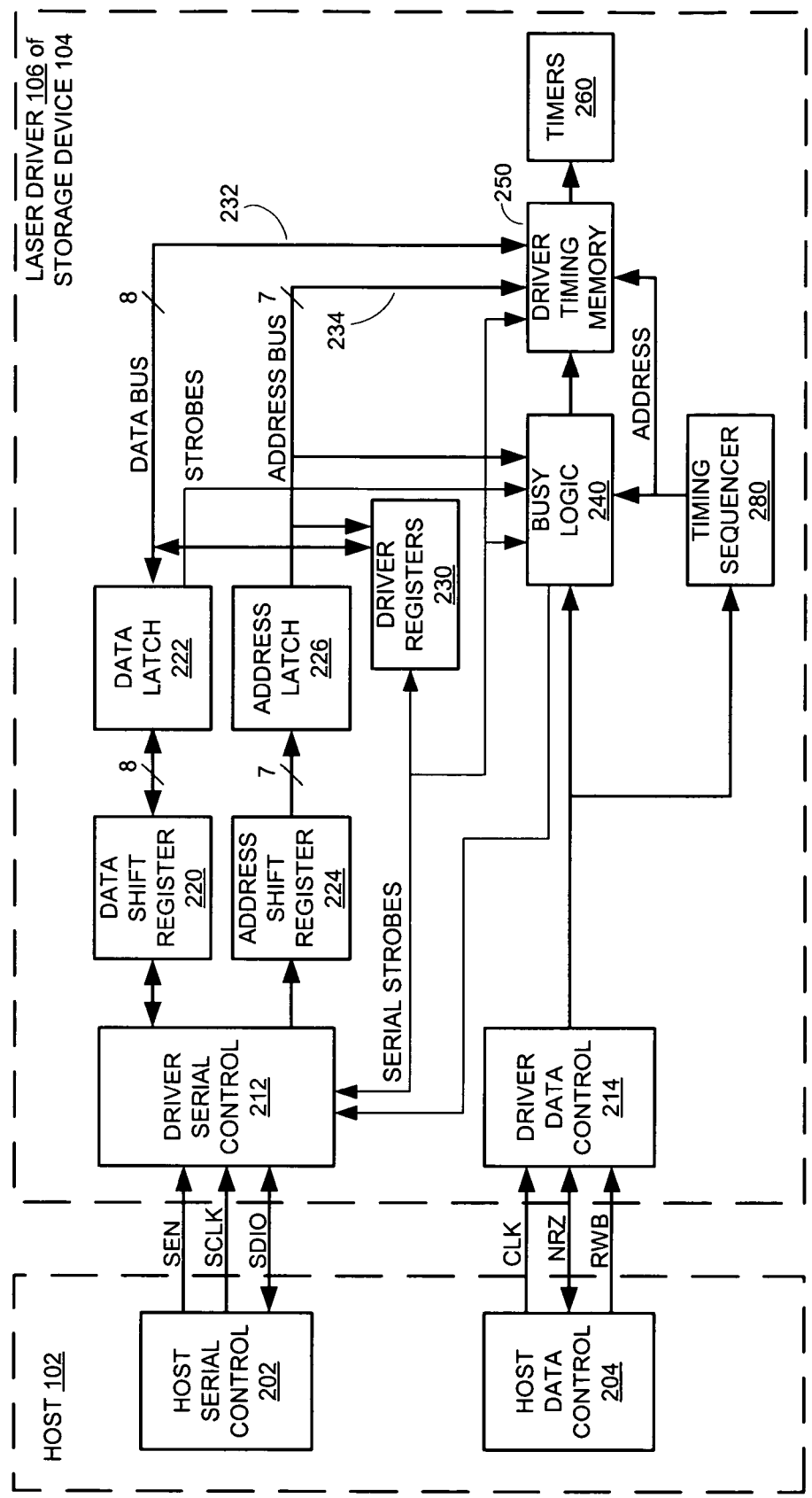
FIG. 2 is a somewhat lower level diagram useful for describing embodiments of the present invention.

FIG. 2 is a somewhat lower level diagram useful for describing embodiments of the present invention. The host 102 is shown as including a host serial controller 202, which includes the hardware, software and/or firmware used to control the serial communication between the host 102 and driver 106. The host serial controller 202 is shown as providing a serial enable (SEN) signal and a serial clock (SCLK) signal to the laser driver 106. Additionally, a bi-directional serial data input/output (SDIO) line allows the host to write data to and read data from registers or other memory locations within the driver 106.

The host 102 is also shown as including a data controller 204, which includes the hardware, software and/or firmware used to the read user data from, and write user data to the user data storage portion (e.g., optical disk) of the storage device 104, using the laser driver 106. The data controller 204 is shown as providing a data clock (CLK) and a read write direction signal (RWB) to the laser driver 106. For example, a LOW RWB signal can designate WRITE, and a HIGH RWB signal can designate READ, or vice versa. A bi-directional data line is labeled NRZ (Non-Return-to-Zero), but can alternatively support Return-to-Zero user data transfers.

In the exemplary environment shown, the laser driver 106 includes a driver serial controller 212 that interfaces with the host serial controller 202. The laser driver 106 is also shown as including driver registers 230, which may include control and/or status registers. The driver registers 230 may also include land and groove amplitude registers, for example. Timers 260, which are used to produce mark-space edges on the optical disk surfaces of the storage device 104, lie dormant until started by a timing sequencer 280. Driver timing memory 250 includes locations that may specify a time delay of each timer 260 for each type of space-mark-space sequence. The timing sequencer 280 feeds the timers 260 with the contents of the driver timing memory 250 and starts the timers 260 at the appropriate time references to the mark-space edges.

The laser driver 106 is also shown as including a driver data controller 214 that interfaces with the host data controller 204. The driver data controller 214 likely includes a phase lock loop circuit (not shown). "Busy" logic 240 (which may also be referred to as "Access Control" logic, or "Memory Access" logic) controls the access to the driver timing memory 250 by, for example, intervening in serial access to the timing memory 250 when the timing sequencer 280 is in operation. Embodiments of the present invention relate more to the serial communication between the host 102 and the storage device 104, rather than the user data communication between the host 102 and the storage device 104. Accordingly, the discussion regarding the host data controller 204 and the driver data controller 214 is limited. One of ordinary skill in the art will appreciate that the host 102, the storage device 104, and the laser driver 106 include many more components that have not be shown to avoid confusion. Further, blocks 240, 250, 260 and 280 have been shown merely to illustrate an exemplary environment in which the double buffering embodiments of the present invention maybe useful. Embodiments of the present invention can also be used in other environments.

Assume, for example, that during a write operation each word (e.g., serial read or write request) sent from the host serial controller 202 to the driver serial controller 212 is 16 bits in length, with the first bit being a mode bit designating read or write (e.g., 0=WRITE; 1=READ), the next 7 bits specifying an address, and the last 8 bits specifying data. The address portion of the word specifies, for example, an address corresponding to a location within the driver registers 230 or the driver timing memory 250. In write mode, the 8 bits of data include the data to be written to the specified address.

The driver serial controller 212 can include a counter (not shown in FIG. 2) that counts clock pulses and a switch (not shown in FIG. 2) that is triggered by the counter. When the host 102 sends a word over the SDIO line to the laser driver 106, the SEN line goes HIGH and one bit of the word is transferred each clock cycle. The driver serial controller 212 uses the counter to count the number clock cycles, to thereby determine whether each bit is a mode bit, an address bit, or a data bit. Using the switch, the driver serial controller 212 shifts the 7 address bits (following the mode bit) into an address shift register 224, and then the following 8 data bits into a data shift register 220. It is possible that a single shift register (e.g., a 15 bit or 16 bit shift register) could be used in the place of two separate shift registers 224 and 220. In such a case, after both the address bits and data bits were shifted into the single shift register during a write operation, the address portion would be shifted in parallel into the address holding register 226, and the data portion would be shifted in parallel into the data holding register 222. However, use of the single shift register would be somewhat more complex during a read operation.

Assuming, for example, that the driver serial controller 212 operates at 100 MHz, then a clock pulse (and a word bit) is transferred each 10 nsec, and the entire 16 bit word is transferred in 160 nsec (not counting any additional time to frame the sequence with SEN). Once transferred, the address portion of the word is stored in address shift register 224, and the data portion of the word is stored in the data shift register 220. Likely, the host 102 will need to send additional words to the laser driver 106, with a typical gap of about 10-20 nsec between consecutive words. However, additional words should not be received by the laser driver 106 until the contents of the address and data shift registers 224 and 220 are emptied. If the contents of shift registers 220 and 224 were used to directly read from or write to the driver registers 230 and/or the driver timing memory 250, then the shift registers 220 and 224 would need be emptied within the 10-20 nsec gap between words. This may not be possible because other elements of the laser driver 106, such as the timing sequencer 280, may have a higher priority access to the busses 232, 234, registers 230 and timing memory 250. Additionally, requiring that the shift registers 220 and 224 be emptied so quickly may require that the other components within the laser driver 106 operate at a much greater speed than 100 MHz.

Embodiments of the present invention overcome the just mentioned time constraints by transferring the contents of the data shift register 220 and the address shift registers 224 to respective holding registers. In accordance with an embodiment of the present invention, during a write operation a data latch 222 is used as the holding register corresponding to the data shift register 220, and an address latch 226 is used as the holding register corresponding to the address shift register 224. After the address in the address shift register 224 is transferred in parallel to the address latch 226, and the data in the data shift register 220 is transferred in parallel to the data latch 222 (which takes about 1 nsec), it will be at least another 16 clock cycles (assuming 16 bit words) before the address shift register 224 and data shift register 220 are again full. Accordingly, the laser driver 106 now has at least 160 nsec (assuming 10 nsec clock pulses, and 16 bit words) to use the address and data stored in the latches 222 and 226 to write to or read from the driver registers 230 or the driver timing memory 250, which is significantly more than enough time. Further, use of the holding registers 222 and 226 enables the speed of driver serial controller 212 to be increased (e.g., from 100 MHz to 400 MHz), without requiring that other components within the laser driver 106 operate faster.

Figure 3:
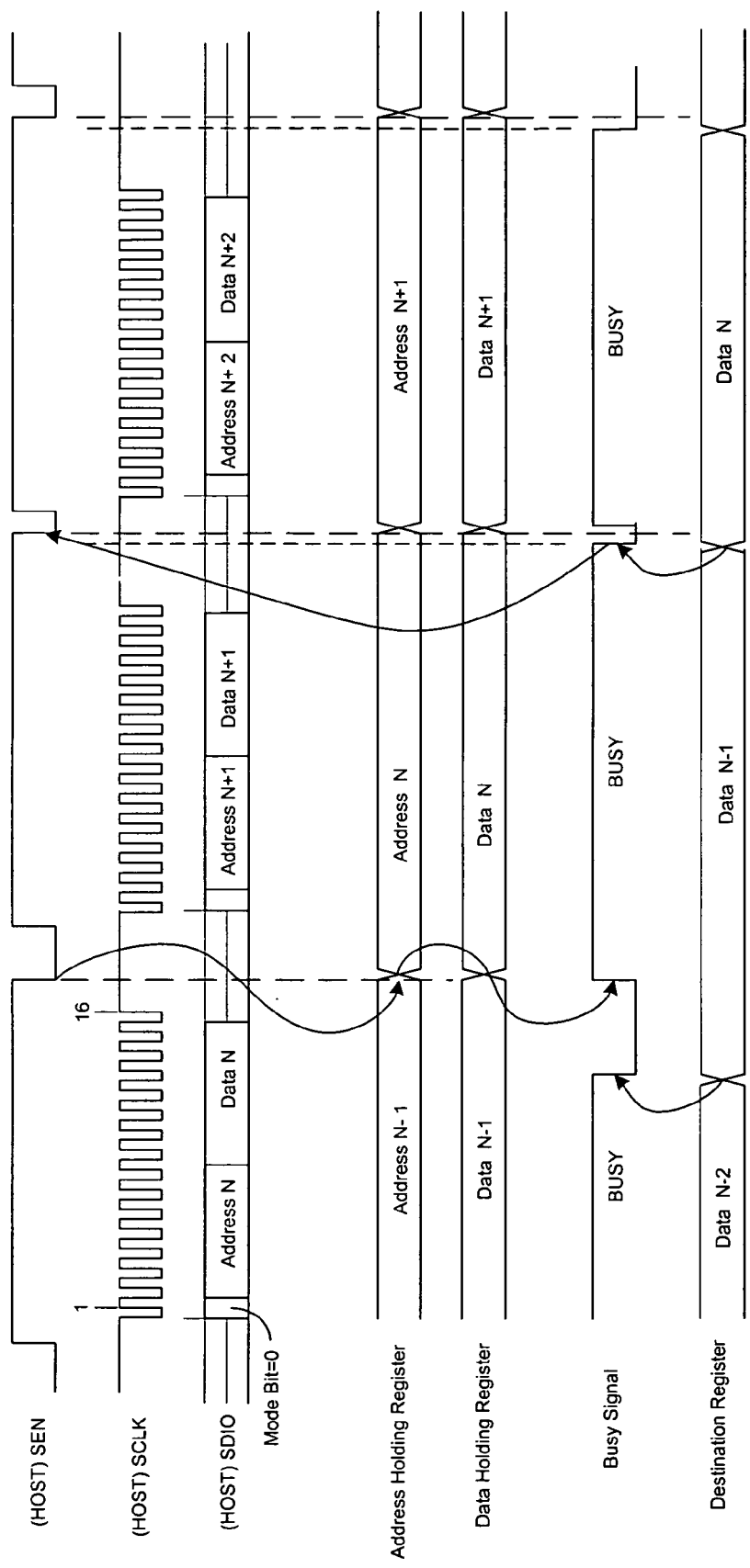
FIG. 3 is a timing diagram that is useful for describing how double buffering, according to embodiments of the present invention, occurs during a write operation.

FIG. 3 is a write operation timing diagram that is useful for further explaining embodiments of the present invention. The host serial controller 202 starts a serial transfer cycle by driving the SEN line HIGH, which will enable the mode, address and data bits to be clocked into the driver serial controller 212 and that address and data bits to be appropriately shifted into the address shift register 224 and data shift register 220. Before dropping the SEN line, the driver controller 212 preferably checks that the BUSY line (from the busy logic 240) is LOW. When the SEN drops LOW, the driver serial controller 212 transfers the address bits and data bits, in parallel, into the address holding register 226 and the data holding register 222. This transfer from the shift registers 224, 220 to the holding registers 226, 222 can be accomplished in less than a clock cycle, as mentioned above. After one clock cycle (e.g., 10 nsec), the address bus 234 settles and the BUSY line is raised if necessary.

In accordance with an embodiment of the present invention, a strobe circuit (e.g., within the driver serial controller 212) is used to control reading and writing. The strobe circuit strobes the busy logic 240, the driver registers 230 and the driver timing memory 250, as can be appreciated from FIG. 2. If the strobe circuit is not enabled, then data can not be written to or read from the driver registers 230 or driver timing memory 250. To provide safety against possible glitches on the SEN line causing noise induced reads or writes, the output of the counter associated with (e.g., within) the driver serial controller 212 is monitored. In accordance with an embodiment of the present invention, the counter is enabled when SEN goes HIGH, and is reset when SEN goes LOW. Additionally, when SEN goes HIGH, the address shift register 224 should be reset. When the counter output reaches a value that provides confidence that it wasn't a glitch that caused the SEN line to go HIGH, then the strobe circuit is enabled. This can be accomplished in various ways, one of which is shown with reference to FIG. 4.

Figure 4:
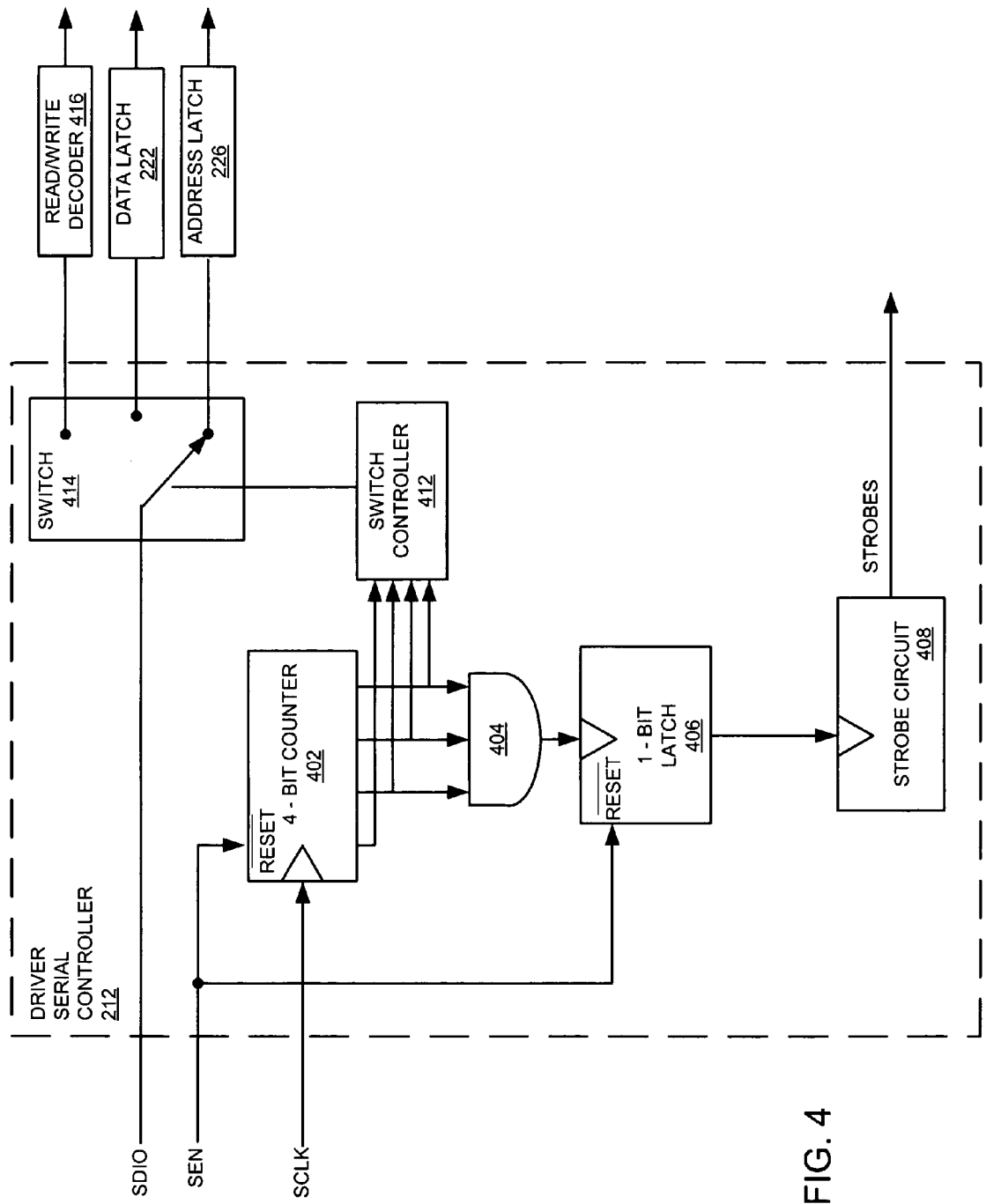
FIG. 4 is a diagram showing portions of the driver serial controller of FIG. 2, in accordance with an embodiment of the present invention.

In accordance with an embodiment of the present invention, an enable input (e.g., pin) of a counter 402 associated with the driver serial controller 212 receives the SEN line, as shown in FIG. 4. The counter 402 is clocked by the SCLK. The output of the counter 402 is provided to logic that will go HIGH when the counter reaches an acceptable value, indicating that the SEN did not go HIGH due to a glitch. Each time the SEN line goes LOW, the counter 402 is reset. Thus, the SEN line must stay HIGH for an acceptable period in order for the logic (receiving the output of the counter 402) to go HIGH. In the example circuit show in FIG. 4, the three least significant bits of the counter 402 are provided to a 3-input AND gate 404. When the counter 402 reaches 7 (when SEN has been HIGH for 70 nsec, assuming 10 nsec clock periods), the three least significant bit output lines of the counter 402 go HIGH, causing the output of the 3-input AND gate 404 to go HIGH. The output of the AND gate 404 is provided to a 1-bit latch 406. The one bit latch 406 is only enabled when SEN is HIGH, and is reset when SEN goes LOW. The output of the 1-bit latch 406 is provided to the enable input of the strobe circuit 408. Thus, the strobe circuit 408 is enabled once the counter 402 counts to 7, in the embodiment shown.

Logic other than the 3-bit AND gate 404 can be used to provide a HIGH input to the 1-bit latch 406. For example, if after 20 nsec there is sufficient confidence that the SEN being HIGH is not due to a glitch, then the 3-input AND gate 404 can be replaced with a 2-input AND gate that receives the two least significant bit outputs from the counter 402 (assuming each clock period is 10 nsec). One of ordinary skill in the art would appreciate that other components in the circuit shown in FIG. 4 can be changed while still being within the spirit and scope of the present invention.

Still referring to FIG. 4, the exemplary embodiment of the driver serial controller 212 is also shown as including a switch controller 412 that controls a switch 414. By receiving the output of the counter 402, the switch controller 412 controls the switch 414 so that serial bits sent over the SDIO line are appropriately passed to a read/write decoder 416, the data latch 222 or the address latch 226.

Figure 5:
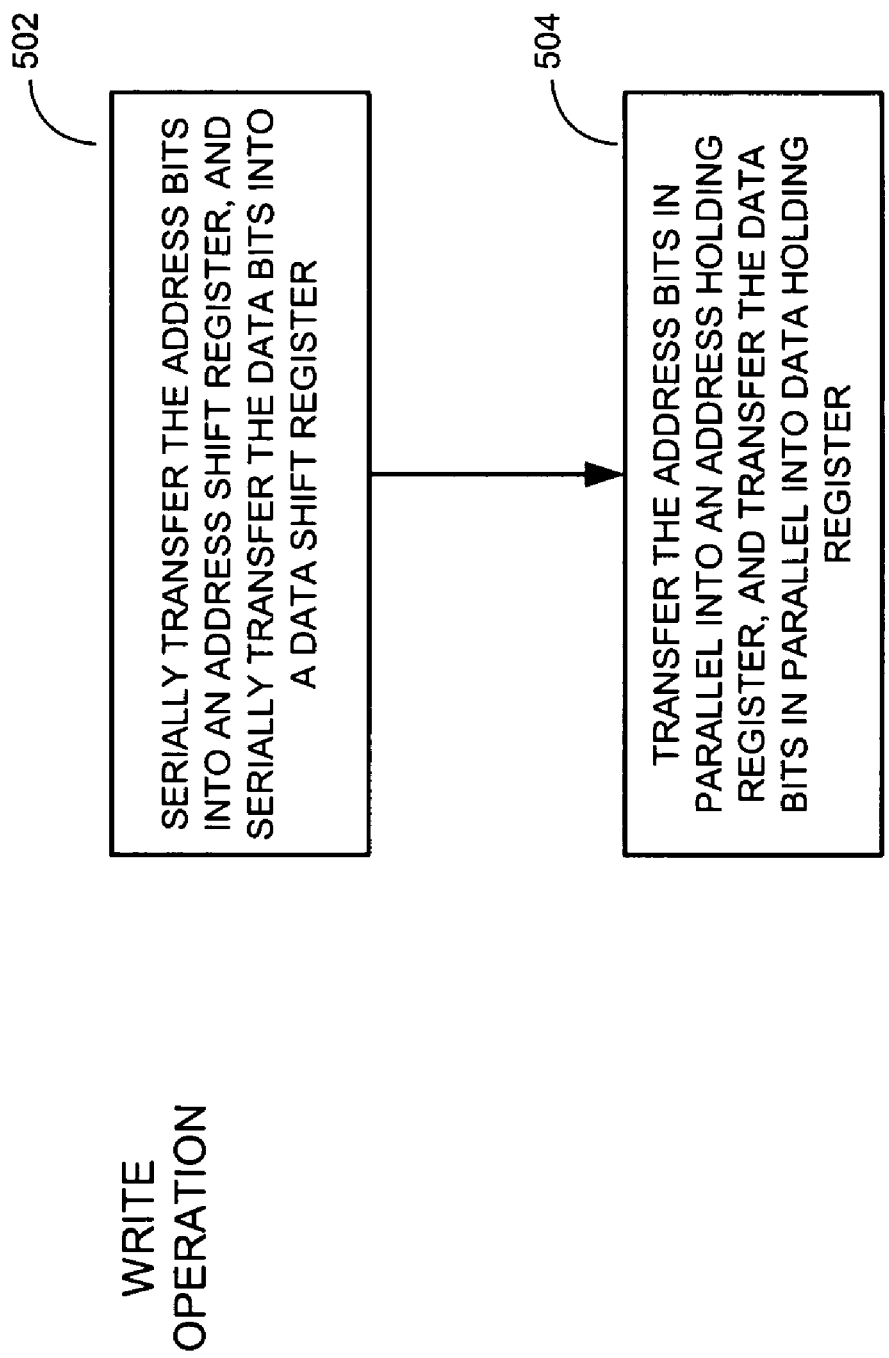
FIG. 5 is a flow diagram useful for describing how double buffering, according to embodiments of the present invention, occurs during a write operation.

Methods of the present invention, relating to write operations, can be summarized with reference to FIG. 5. At a step 502, a word including address bits and data bits is received serially. This can be accomplished, for example, by receiving one bit of the word per clock cycle. As the address bits and data bits are received, the address bits are serially transferred into an address shift register (e.g., 220), and the data bits are serially transferred into a data shift register (e.g., 220), as indicated at step 502. The address bits identify a location (register or memory location) to which to write the data bits.

After completing the serial transfer of the address bits into the address shift register, the address bits are transferred in parallel to an address holding register (e.g., 226), as specified at step 504. Similarly, after completing the serial transfer of the data bits into the data shift register, the data bits are transferred in parallel into a data holding register (e.g., 222). Since the address shift register will be filled prior to the data shift register, the parallel transfer from the address shift register to the address holding register can occur before all the data bits are shifted into the data shift register. This would allow the device (e.g., 106) to begin processing the address information earlier. Alternatively, the parallel transfers of address bits and data bits from the respective shift registers to the respective holding registers could occur in parallel. As was explained above, after completing the parallel transfer of the address bits and data bits from the address and data shift registers to the address and data holding registers, the address and data shift registers are available to serially receive additional address bits and data bits of an additional word.

It is noted that during read operations, one extra (e.g., dummy) read data cycle is used, since the data holding register 222 delays the read-back data by one read cycle. For example, if the host 102 is reading back four addresses (they do not have to be sequential), the general flow would look like the following:

Send Address N
Read data previously stored in holding register (use it or discard it)
Send Address N+1
Read Data from Address N
Send Address N+2
Read Data from Address N+1
Send Address N+3
Read Data from Address N+2
Send Address N+4
Read Data from Address N+3

In other words, five addresses are sent, and five address cycles occur, in order to read four addresses. More generally, in order to read N addresses (which may or may not be sequential), N+1 read cycles are used. However, in many applications (such as in a laser diode driver application) the host 102 seldom reads data using the serial interface, except during testing and debugging. Thus, the extra read cycle does not occur often, except in a non-time critical operation. Also, since the host knows that the data it is reading is delayed by one read cycle, the host may merely wait until a further read cycle is performed to get data that is delayed due to the double buffering.

Figure 6:
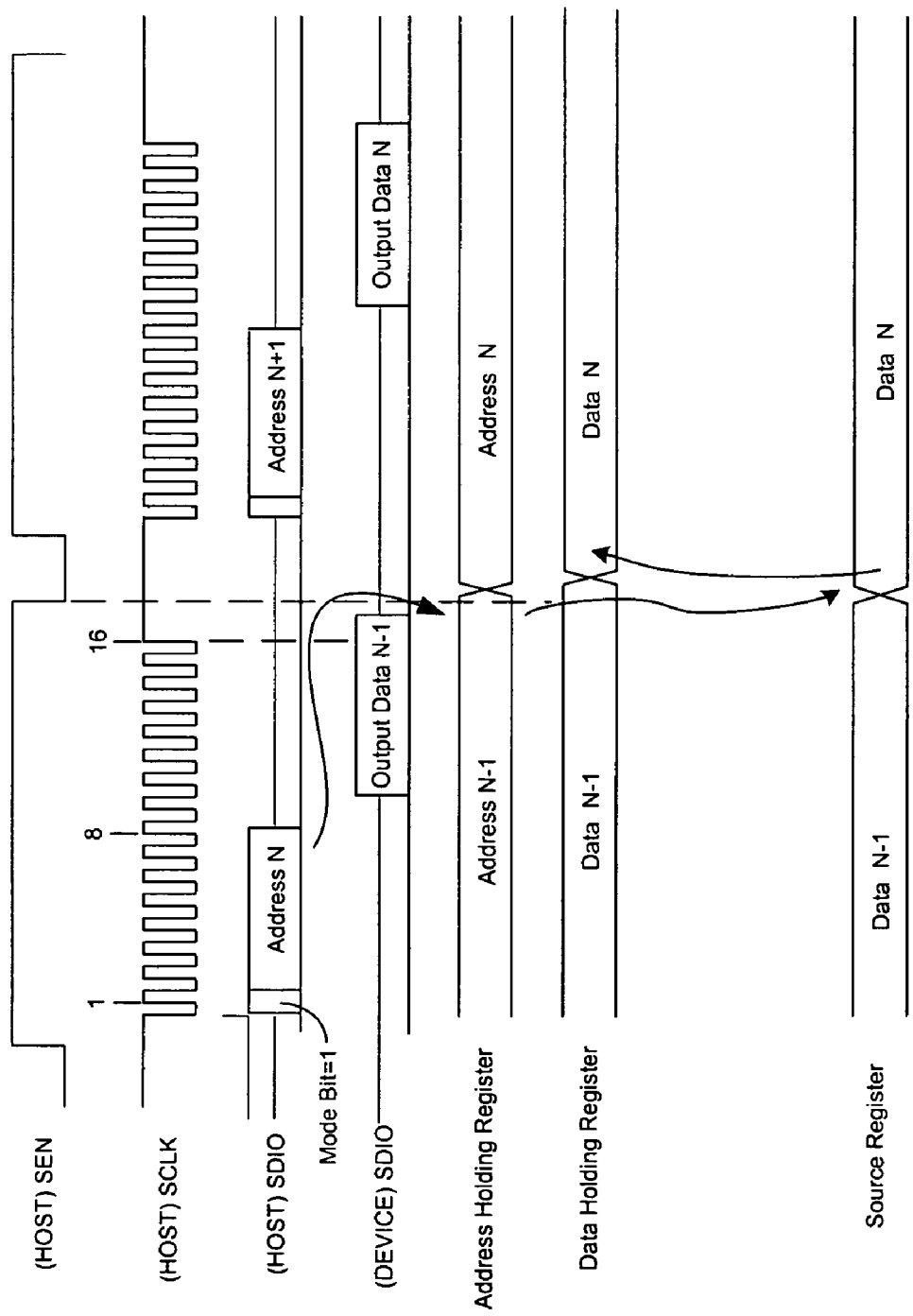
FIG. 6 is a timing diagram that is useful for describing how double buffering, according to embodiments of the present invention, occurs during a read operation.

FIG. 6 is a read operation timing diagram that is useful for further explaining embodiments of the present invention. The host serial controller 202 starts a serial transfer cycle by driving the SEN line HIGH, which will enable the mode and address bits to be clocked by the driver serial controller 212 and appropriately shifted into the address shift register 224. The data already present in the data shift register (e.g., from a previous read operation) will then be serially transferred (e.g., over the SDIO line) from the data shift register 222 to the host 102. When the SEN goes LOW, the address bits in the address shift register 224 will be transferred in parallel to the address holding register 226. These address bits are then used to read the requested data bits (at the location specified by the address bits) into the data holding register 222. These data bits are then transferred in parallel from the data holding register 222 to the data shift register 220. To actually get the data in the data shift register 220, the host must initiate another read cycle so that the this data can get serially shifted to the host (e.g., over the SDIO line).

Figure 7:
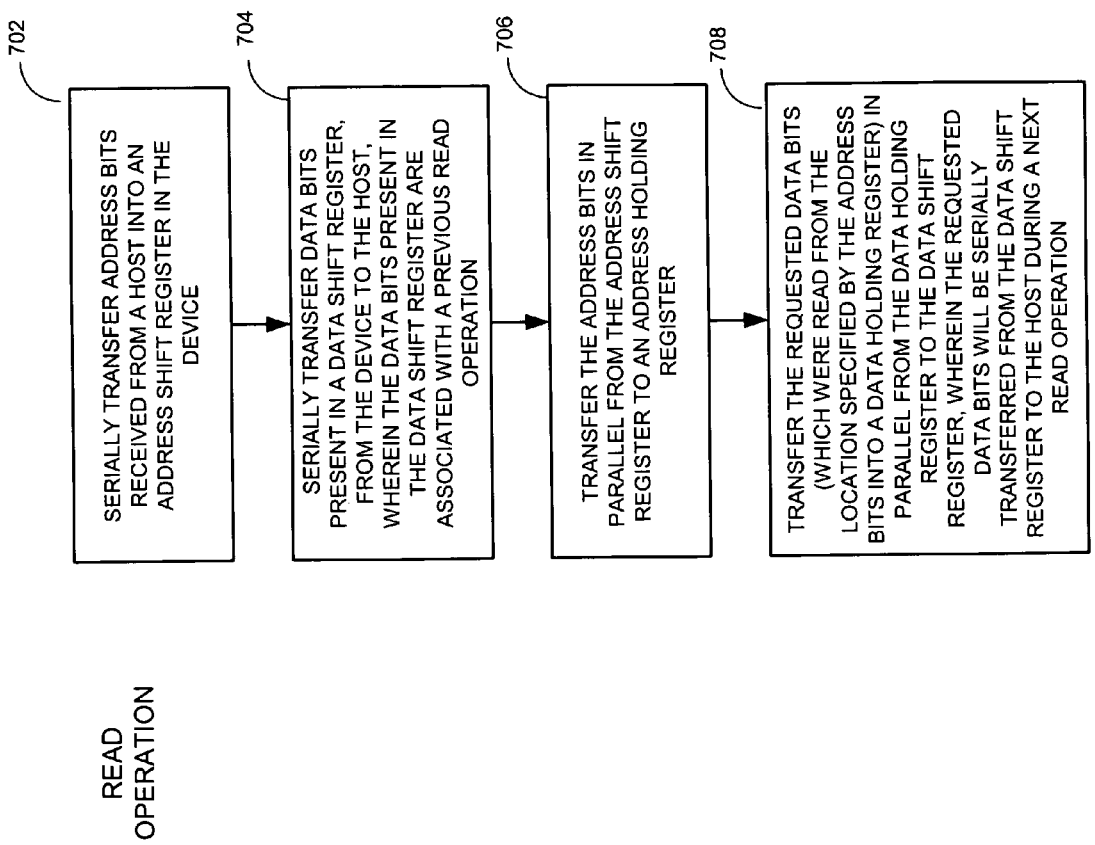
FIG. 7 is a flow diagram useful for describing how double buffering, according to embodiments of the present invention, occurs during a read operation.

Embodiments of the present invention, relating to read operations, can be summarized with reference to FIG. 7. At a step 702, address bits are serially transferred from the host into an address shift register (e.g., 224) in a device (e.g., a laser driver of a storage device). At a step 704, data bits present in a data shift register (e.g., 220) in the device, are serially transferred from the device to the host. These data bits present in the data shift register are associated with a previous read operation. After completing the serial transfer of the address bits into the address shift register, the address bits are transferred in parallel into an address holding register (e.g., 226) in the device. These address bits identify the source location (e.g., register or memory location), which contains the requested data bits. At a step 706, after the requested data bits are read from the source location into a data holding register (e.g., 222), the requested data bits are transferred in parallel from the data holding register to the data shift register (e.g., 220). The requested data bits will then be transferred, serially, from the data shift register to the host the next time the host performs a read operation. Thus, if the host needs that data immediately (yet does not need to read additional data at the time), the host may perform a dummy read operation to thereby cause that data to get serially transferred to the host.

Embodiments of the present invention can be used in other environments besides a laser driver. That is, embodiments of the present invention can be used anywhere it is desirable to increase the speed of serial transfers, where the device hardware may otherwise prevent a direct transfer because of some operation in the process.

Embodiments of the present invention, in general, provide double buffering of serial transfers. The shift registers 224 and 220 perform the first buffering; and the holding registers 226 and 222 perform the second buffering. By using this double buffering scheme, the device (e.g., laser driver 106) receiving the serial transfers is provided with a significant additional amount of time to deal with each word that is serially transferred. This enables the serial transfer rate to be increased, without increasing the operating requirements (e.g., the speed of a phase locked loop) associated with the laser driver.

Embodiments of the present invention also provide a safety against possible glitches on a serial enable (SEN) line causing accidental reads or writes.

The forgoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art. Embodiments were chosen and described in order to best describe the principles of the invention and its practical application, thereby enabling others skilled in the art to understand the invention. It is intended that the scope of the invention be defined by the following claims and their equivalents.

What is claimed is:

1. A laser driver for driving a laser diode of an optical storage device that includes an optical disk, the laser driver including:
    timers that are used to produce mark-space edges on a surface of the optical disk;
    driver registers including land and groove amplitude registers;
    driver timing memory that stores delays of said timers for various mark-space sequences;
    a laser driver serial controller to control serial transfers between said driver registers and driver timing memory of the laser driver and a host, said laser driver serial controller configured to receive a serial enable (SEN) signal, a serial clock (SCLK) signal and a serial data input signal from the host, and said laser driver serial controller configured to send a serial data output signal to the host;
    an address shift register to serially receive address bits from the host, the address bits identifying a location, within said driver registers or said driver timing memory, to which to write data bits, or from which to read data bits;
    a data shift register, to serially receive data bits from the host during a write operation, and to serially transfer data bits to the host during a read operation;
    an address holding register to receive a parallel transfer of address bits from said address shift register; and
    a data holding register, to receive a parallel transfer of data bits from said data shift register during a write operation, and to transfer in parallel data bits to said data shift register during a read operation;
    wherein during a write operation, after the parallel transfers of the address bits and data bits from said address and data shift registers to said address and data holding registers, said address and data shift registers are available to serially receive additional address bits and data bits from the host, prior to the data bits in said data holding register being written to the location within said driver registers or said driver timing memory identified by the address in said address holding register.

2. The laser driver of claim 1, wherein use of said data holding register and said address holding register, during serial transfers between said laser driver serial controller and the host, enables said laser driver serial controller to operate at a higher frequency than other components of said laser driver, thus allowing for serial transfer speeds that exceed operating speeds of other components of said laser driver.

3. The laser driver of claim 1, wherein the said laser driver serial controller includes a counter that receives the serial clock (SCLK) signal, and wherein said laser driver serial controller uses said counter to determine which bits are address bits and which bits are data bits.

4. The laser driver of claim 3, wherein, during a write operation, said laser driver serial controller includes a switch to select between transferring bits to said address shift register and said data shift register.

5. The laser driver of claim 1, further comprising:
a parallel address bus connecting said address holding register to said driver registers and said driver timing memory; and
a parallel data bus connecting said data holding register to said driver registers and said driver timing memory.

6. The laser driver of claim 1, wherein during a read operation, data bits transferred from said data shift register to the host, are associated with a previous read operation.

7. The laser driver of claim 1, wherein said address and data holding registers each comprises a latch.

8. The laser driver of claim 6, wherein during a read operation, requested data bits will be transferred, serially, from said data shift register to the host the next time the host performs a read operation.

9. The laser driver of claim 6, wherein during a read operation, N+1 read cycles are required to read N addresses.

10. The laser driver of claim 8, wherein the N+1$^{th}$ read cycle is a dummy read cycle that is used to transfer data bits associated with an N$^{th}$ address, from said data shift register to the host.

11. A laser driver, including:
a serial controller to control serial transfers between the laser driver and a host wherein the serial controller includes a counter that receives a serial clock (SCLK) signal, and wherein the serial controller uses a counter to determine which bits are address bits and which bits are data bits;
an address shift register to serially receive address bits from a host, the address bits identifying a location to which to write data bits, or from which to read data bits;
a data shift register, to serially receive data bits from the host during a write operation, and to serially transfer data bits to the host during a read operation;
an address holding register to receive a parallel transfer of address bits from the address shift register;
a data holding register, to receive a parallel transfer of data bits from the data shift register during a write operation, and to transfer in parallel data bits to the data shift register during a read operation; and
logic that receives at least two least significant bits from the counter to thereby provide a level of confidence that a serial enable signal going high was not due to a glitch.

12. The laser driver of claim 11, wherein the logic includes:
an AND gate that receives the at least two least significant bits from the counter;
a 1-bit latch that includes a data input that receives an output from the AND gate, and an enable input attached to a send enable (SEN) line; and
a strobe circuit including an enable input that receives an output of the 1-bit latch;
wherein an output of the strobe circuit is used to ensure that possible glitches on the SEN line do not cause accidental reads or writes.

* * * * *